Patented Nov. 6, 1928.

1,690,225

UNITED STATES PATENT OFFICE.

ALBERT W. HAHN, OF SALT LAKE CITY, UTAH.

OIL-FLOTATION PROCESS.

No Drawing.   Application filed October 5, 1926. Serial No. 139,755.

This invention relates to the recovery of copper and other metals from ores, by the flotation process, and the main object of the invention is to eliminate the deleterious effects of soluble salts present in the ore pulp, such as salts of iron and manganese which seriously effect the recovery of such metals.

It is well known that various soluble salts of iron and manganese seriously effect the successful operation of concentration by the flotation process. I have found that those salts of metals which are capable of existing in different stages of oxidation, such as iron and manganese, are less detrimental to the recovery of metals by the flotation process when present in the ore pulp in a higher oxidized form, and the present invention involves the step of changing these constituents into higher oxidized forms.

The following table shows the results obtained by subjecting different ores to a flotation process:

Ores containing ferrous sulphate

| Lbs. $FeSO_4$ per ton of ore | Per cent copper in tailings |
|---|---|
| 1.5 | 0.19 |
| 3.0 | 0.16 |
| 4.5 | 0.22 |
| 6.0 | 0.79 |
| 7.5 | 0.73 |

Ores containing ferric sulphate

| Lbs. $Fe_2(SO_4)_3$ per ton of ore | Per cent copper in tailings |
|---|---|
| 2.0 | 0.08 |
| 4.0 | 0.10 |
| 6.0 | 0.13 |
| 8.0 | 0.11 |
| 10.0 | 0.14 |

The above table makes it clear that the recovery of copper is more complete when the ore contains ferric sulphate than it is when the ore contains ferrous sulphate, the lower oxidized form.

I have found that when the ore pulp is treated with an oxidizing agent previous to subjecting the pulp to the flotation process, the recoveries of metals are improved. In carrying out my process, the ore is first crushed and ground to bring it to a suitable state of division, say 60 mesh or finer, either with or without an alkali or alkaline earth, and the pulp containing the finely ground ore and water may then be subjected to the action of an oxidizing agent, such as bleaching powder, or, if preferred, the oxidizing agent may be brought in contact with the ore pulp during the grinding stage. If no alkali or alkaline earth had been added at the grinding stage, it may be added coincidentally with the oxidizing agent, and the pulp so treated agitated for a sufficient time to convert those soluble constituents and those constituents are dy precipitated by the alkali or alkaline earth which were originally present, in a low ate of oxidization, to a higher state of oxidation, as, for instance, manganous and ferrous sulphates and manganous and ferrous hydrates, would be converted into, in the presence of an alkali or alkaline earth, manganic and ferric hydrates or basic manganic and ferric sulphates, or a mixture of these oxidized compounds. The so-treated pulp is then subjected to a froth flotation operation.

Examples of the improvements due to this treatment of ore pulps previous to flotation are as follows: The ore used came from the Braden Copper Company, Chile, S. A., and assayed, 2.10% total copper, of which 0.20% was nonsulphide copper.

| Method of treatment. | Per cent copper in tailings. | |
|---|---|---|
| | Total. | Nonsulphide copper. |
| 1. No oxidizing agent. Reagents, lime, xanthate, pine oil | 0.35 | |
| 2. 2 lbs. bleaching powder per ton—same reagents. | 0.26 | 0.20 |
| 3. Oxygen passed into ore pulp—same reagents. | 0.26 | |

Another sample of Braden ore was tested, which assayed 2.12% total copper, of which 0.36% was nonsulphide copper.

| Method of treatment. | Per cent copper in tailings. | |
|---|---|---|
| | Total. | Nonsulphide copper. |
| 4. No oxidizing agent. Reagents, xanthate and pine oil | 0.50 | |
| 5. 2 lbs. bleaching powder per ton. Same reagents. | 0.37 | 0.34 |

A copper ore, which contained ten pounds of normal ferrous sulphate per ton, gave the following results:

| Method of treatment. | Per cent copper in tailings. | |
|---|---|---|
| | Total. | Nonsulphide copper. |
| 6. No oxidizing agent. Reagents, lime, xanthate, Cleveland Cliffs creosote | 0.17 | 0.06 |
| 7. 2 lbs. bleaching powder. Reagents same as above | 0.12 | 0.06 |
| 8. 3 lbs. bleaching powder. Reagents same as above | 0.09 | 0.06 |

It is evident from the foregoing tests and examples that by the simple treatment as outlined and which can be duplicated by anyone skilled in the art, improved recoveries of metals are obtained, and also where the water used in the process is returned and re-used continuously, this water will not build up insoluble salts, and all working conditions are improved thereby.

Various oxidizing agents may be employed besides those shown in the examples and I do not wish to limit myself in any way to any specific method of oxidization.

I claim:

1. The process of recovering metals from their ores, which comprises treating the pulp containing the ore to the oxidizing action of bleaching powder in the presence of an alkaline substance and thereby precipitating oxides associated with the values to be recovered by changing them into higher oxides, and then adding a flotation agent and subjecting the pulp to a froth flotation process.

2. The process of recovering metals from their ores which comprises converting metallic oxides associated with the values to be recovered to higher oxides by means of an oxidizing agent and thereby precipitating said oxides, and then subjecting the so-treated pulp to froth flotation.

In testimony whereof I affix my signature.

ALBERT W. HAHN.